United States Patent Office 3,396,154
Patented Aug. 6, 1968

3,396,154
SODIUM BOROHYDRIDE AS A POLYMERIZATION
INHIBITOR FOR A REDOX SYSTEM
Howard A. Chamberlin, Raleigh, and James C. Masson,
Chapel Hill, N.C., assignors to Monsanto Company,
St. Louis, Mo., a corporation of Delaware
No Drawing. Filed Apr. 14, 1965, Ser. No. 447,953
5 Claims. (Cl. 260—85.5)

ABSTRACT OF THE DISCLOSURE

In continuous, redox catalyzed, vinyl polymerization reaction, particularly those where acrylonitrile is the major component, sodium borohydride has been found to be an effective inhibitor to prevent further polymerization of unreacted monomers.

---

This invention relates to polymerization inhibitors for acrylonitrile polymers and, more particularly, to the use of sodium borohydride to prevent further polymerization of unreacted monomers in a continuous vinyl polymerization reaction.

In the addition polymerization of vinyl monomers, the composition of the resulting polymer generally undergoes constant change during its formation. In the case of mixtures of such monomers, the percentage composition represented by the various monomers in the resulting copolymers undergoes change throughout the course of the polymerization reaction. Changes in the physical properties of the resulting polymers take place constantly during the reaction and the properties of the final polymers depend to a large extent on the degree of completion of the polymerization reaction. Such properties that vary constantly during the course of the polymerization include the specific viscosity of the resulting polymer, its average molecular weight, its solubility in various solvents and so forth. Therefore, it is highly desirable to provide a method for the controlled termination, inhibition or shortstopping of such polymerizations at any desired point and the recovery of an essentially pure unreacted monomer. In the case of continuous polymerization systems it is particularly necessary to be able to provide for such termination, inhibition or shortstopping where the polymer produced must be held in the form of a slurry or emulsion in contact with unreacted monomers and catalysts for varying periods of time before separation. Thus, in an aqueous polymerization of an acrylonitrile polymer or copolymer with another vinyl monomer wherein the polymer produced is withdrawn from the polymerization vessel in the form of an aqueous slurry containing substantial quantities of unreacted monomers and catalysts in solution, the physical properties and composition of the polymer existing at the time of withdrawal of the slurry are considerably changed if polymerization of any of the monomers present in solution is allowed to continue beyond the point of withdrawal. Such continued polymerization is the inevitable result of holding the unterminated polymer in contact with monomers and catalysts for varying periods of time prior to final separation of the polymer product. It has therefore, been considered very desirable to develop means for controlled and definite termination of polymerization of vinyl monomers as well as recovery of these monomers in as pure a state as possible so they may be easily used in subsequent polymerization reactions.

Many methods have been suggested in the past for achieving such controlled termination, inhibition or shortstopping of the polymerization reaction and recovery of the unreacted monomer. Termination of polymerization reactions has been accomplished in the past by the use of a great variety of compounds, such as hydroquinone, quinone, and other quinoid-type compounds. Other conventional commercial shortstopping agents may consist of a water soluble salt of a dithiocarbamic acid as, for example, alkali metal salts of a dialkyl dithiocarbamic acid such as sodium dimethyl dithiocarbamate, or a mixture of a water-soluble salt of a dithiocarbamic acid and a polysulfide as, for example, sodium polysulfide. However, none have been fully satisfactory, particularly for use in the production of polymers to be employed in making synthetic fibers. This has been due to the severe restriction on the introduction of color into such polymers imposed by the needs of the textile industry. Substantial halting of the polymerization reaction can be accomplished by cooling the reaction mass, but this is not satisfactory as expensive equipment will be necessary, and it is almost impossible to cool a large mass quickly so that additional polymerization beyond that desired will be prevented. Moreover, the means for separation of the monomer from the reacting mass, which includes the unreacted monomers, often involves temperature conditions which will again induce polymerization making the cooling procedure ineffective. Much work has been directed toward discovering compounds which would act as shortstopping agents for the addition polymerization reaction and would aid in keeping down impurities in the unreacted monomers mass. Such additional compounds as furfural have also been widely used for shortstopping. However, these previously proposed compounds have either been found to be ineffective in completely halting the polymerization or have been found to be effective only in such concentrations as result in extreme staining or discoloration of the polymer produced and add also to the impurity of the unreacted monomers. Also, quantities of reducing agents such as sodium bisulfite, thiosulfate or oxalates well in excess of the amount normally used in a redox catalyst system are present. In addition, it is economically desirable to recover the unreacted monomers present in the shortstopping slurry. This has been done by steam stripping of the aqueous liquor from the polymer separation step. If a sulfoxy reducing agent such as a sulfite, bisulfite or sulfur dioxide has been used in the redox catalyst system, or if one of these materials were used as a short stop the aqueous liquor would contain free sulfur dioxide which would then pass overhead with unreacted monomer in the recovery system during the steam stripping operation and tend to cause polymerization in subsequent parts of the recovery system, thus plugging the recovery system and resulting in a shut down which is expensive and time consuming.

An object of this invention is to provide an effective inhibitor to prevent polymerization of unreacted monomers in the over-flow from a continuous polymerized acrylonitrile polymer system.

Another object is to provide a method for the controlled continuous polymerization of acrylonitrile polymers using sodium borohydride as a polymerization inhibitor.

Yet another object is to shortstop the reaction of a redox catalyzed vinyl polymerization and to prevent premature polymerization of recovered monomers in the monomer recovery system.

Other objects and advantages of the invention will be apparent to those skilled in the art from the following more detailed description.

These and other objects of the invention are attained by shortstopping the polymerization of vinyl monomers using a process which comprises adding to an aqueous polymerization reaction mixture comprising vinyl monomers, polymer thereof, and a redox catalyst system, a small amount of sodium borohydride to the reaction mass.

In accordance with the present invention the sodium borohydride is employed to terminate the polymerization and enables recovery of substantially pure unreacted monomers of those vinyl compounds which undergo addition polymerization to form high molecular weight linear polymer, by which is meant that a large number of monomer molecules add on to one another to form a large molecule having a predominately linear structure. The inhibitor of the invention is of particular utility in the controlled termination of the polymerization and recovery of substantially pure unreacted monomers when polymerizing a vinyl monomeric material comprising acrylonitrile with one or more other compounds containing the characteristic $CH_2=C<$ group which are copolymerizable therewith, such as, for example, the aryl olefins, particularly styrene; acrylic acid and substituted acrylic acids; acrylates such as methylmethacrylate, ethylmethacrylate and butylmethacrylate; acrylamide; methylisopropenyl ketone; vinyl halides such as vinyl chloride, vinylidene chloride, and vinyl bromide; vinyl acetate, vinyl formate; methacrylonitrile and similar compounds. Copolymerization of acrylonitrile and any of the above monomers find particular application in the field of synthetic fibers when composed of at least about 80% by weight of acrylonitrile and up to about 20% of one of the other vinyl monomers. The process of this invention is especially effective in the recovery of a substantially pure unreacted monomer in which one of the vinyl monomers is a vinyl ester such as vinyl acetate, vinyl propionate, vinyl butyrate, vinyl valerate, vinyl pelargonate, vinyl stearate, and vinyl laurate.

The polymer may also be a ternary interpolymer, for example, products obtained by the interpolymerization of acrylonitrile and two or more of any of the monomers other than acrylonitrile enumreated above. More specifically, and preferably, the ternary polymers will contain from 80 to 98 percent of acrylonitrile, from 1 to 10 percent of a vinyl pyridine or a 1-vinyl imidazole, and 1 to 18 percent of another copolymerizable mono-olefinic substance, such as methacrylonitrile, vinyl acetate, methylmethacrylate vinyl chloride, vinylidine chloride and the like.

The polymerization can also involve polymers which may be a blend of polyacrylonitrile or a copolymer of from 80 to 99 percent acrylonitrile and from 1 to 20 percent of at least one other mono-olefinic copolymerizable monomeric substance with from 2 to 50 percent of the weight of the blend of a copolymer of from 10 to 70 percent of acrylonitrile and from 30 to 90 percent of at least one other mono-olefinic copolymerizable monomer. Preferable when the polymeric materials comprise a blend it will be a blend of from 80 to 99 percent of a copolymer of 80 to 98 percent acrylonitrile and from 2 to 20 percent of another mono-olefinic monomer, such as vinyl acetate, which is not receptive to dye stuff, with from 1 to 20 percent of a copolymer of from 30 to 90 percent of a vinyl substituted tertiary heterocyclic amine such as vinyl pyridine, a 1-vinyl imidazole, or a vinyl lactam, and from 1 to 70 percent of acrylonitrile to give a dyeable blend having an overall vinyl substituted tertiary heterocyclic amine content of from 2 to 10 percent based on the weight of the blend.

The sodium borohydride inhibitor is effective in the controlled termination of the addition polymerization reaction occurring when the vinyl polymerization materials are subjected to any of the well known methods of polymerization which are catalyzed by the redox catalyst system; those in which a catalyst-activator system is employed containing both an oxidizing and a reducing agent in which the activator is a water soluble oxidizable sulfoxy compound in which the valence of a sulfur atom does not exceed four. Thus, the polymerization of the above defined vinyl monomeric materials can be carried out in a heterogenous system such as an aqueous emulsion or a dispersion wherein the monomeric material is dispersed in a suitable liquid such as water, optionally with the aid of a suitable emulsifying agent, and polymerization is effected by adding the redox polymerization catalyst and activator and agitating until the polymer is formed. The inhibitor for the present invention is of particular value in the controlled termination of the polymerization reaction where the polymerization is conducted in a homogeneous system as by heating the monomeric material in a suitable solvent in the presence of redox polymerization catalyst-activator systems.

The sodium borohydride inhibitor of the present invention is an effective terminator for polymerizations and monomer recovery in which the redox catalyst system employs as a catalyst an oxygen-liberating compound of the type generally recognized as effective in vinyl polymerizations and as an activator a water soluble oxidizable sulfoxy compound in which the valence of a sulfur atom does not exceed four. In such redox systems the catalyst may, for example, comprise perborates, perchlorates, persulfates, persulfuric acid, and perdisulfates. Likewise, the activator may, for example, comprise inorganic oxidizable sulfoxy compounds, such as sulfur dioxide, sodium bisulfite, meta-bisulfite, sodium hydrosulfite and sodium thiosulfate or organic oxidizable sulfur compounds such as dialkyl sulfites, p-toluene sulfinic acids and formamidine sulfinic acids.

The amount of sodium borohydride to be added to effectively and rapidly terminate the polymerization reaction at the point desired may range from 0.1 to 5.0 percent based on the total weight of monomeric reactants being fed originally to the reactor vessel. While larger amounts may be used, any large excess over the amounts stated only adds to the final cost of the polymer and is of no advantage. Therefore, in general it is most preferred to employ amounts ranging from 0.1 to 2.0 percent based on monomer weight.

In order that those skilled in the art may better understand how the present invention can be carried into effect, the following examples are given by way of illustration and not by way of limitation. All parts and percents are by weight unless otherwise indicated.

Example I

A continuous polymerization of a monomer mixture containing 91 percent acrylonitrile and 9 percent vinyl acetate was conducted with a standard 0.7 percent $K_2S_2O_8$, 1.6 percent $SO_2$, based on monomer weight, redox catalyst system. The addition of 2.0 percent sodium borohydride, based on monomer weight, to the overflow effectively inhibted any further polymerization. A sample of filtrate from the overflow showed polymer as soon as the slurry reached room temperature after being short-stopped with ice. A sample of filtrate from the overflow showed no polymer after adding 2.0 percent sodium borohydride and furthermore no polymer was noted after 16 days. The action of the sodium borohydride thus appears to be permanent and is effective at room temperature.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

We claim:
1. The method of terminating the polymerization of an acrylonitrile polymerization reaction mixture which comprises adding from 0.1 to 5.0 percent of sodium borohydride, based on the total weight of monomeric reactants in the mixture to a polymerization reaction mixture comprising in an aqueous medium at least about 80 percent acrylonitrile and up to 20 percent of at least one other copolymerizable vinyl monomer, polymer thereof, and catalyst and activator members of a redox catalyst system, to immediately terminate polymerization.

2. The method of claim 1 wherein the activator member of the redox catalyst system is a water-soluble sulfoxy reducing agent which has a sulfur atom having a valance not exceeding 4.

3. The method of claim 1 wherein from 0.1 to 2.0 percent of sodium borohydride is added.

4. The method of terminating the copolymerization of acrylonitrile and vinyl acetate which comprises adding from 0.1 to 5.0 percent of sodium borohydride, based on the total weight of acrylonitrile and vinyl acetate, to a polymerizing reaction mixture comprising in an aqueous medium at least about 80 percent acrylonitrile and up to 20 percent of vinyl acetate, polymer thereof, and catalyst and activator members of a redox catalyst system, to immediately terminate polymerization.

5. The method of claim 4 wherein the catalyst and activator are potassium persulfate and sulfur dioxide.

References Cited
UNITED STATES PATENTS

| | | | |
|---|---|---|---|
| 2,963,459 | 12/1960 | Nicholson et al. | 260—85.5 |
| 3,084,143 | 4/1963 | Hieserman et al. | 260—85.5 |
| 3,092,613 | 6/1963 | Kennerly et al. | 260—85.5 |
| 3,153,024 | 10/1964 | Thompson et al. | 260—85.5 |
| 3,299,023 | 1/1967 | Grosser et al. | 260—88.3 |
| 3,306,886 | 2/1967 | Grosser et al. | 260—88.3 |

JOSEPH L. SCHOFER, *Primary Examiner.*

H. WONG, *Assistant Examiner.*